US008687077B2

(12) United States Patent
Choi et al.

(10) Patent No.: US 8,687,077 B2
(45) Date of Patent: Apr. 1, 2014

(54) METHOD AND SYSTEM FOR CONTROLLING CAMERA THROUGH WIRELESS SENSOR NETWORK

(75) Inventors: Wook Choi, Hwaseong-si (KR); Hyo-Hyun Choi, Seoul (KR); Tae-Shik Shon, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 877 days.

(21) Appl. No.: 12/238,569

(22) Filed: Sep. 26, 2008

(65) Prior Publication Data

US 2009/0086041 A1  Apr. 2, 2009

(30) Foreign Application Priority Data

Sep. 28, 2007 (KR) ........................ 10-2007-0097979

(51) Int. Cl.
*H04N 5/228* (2006.01)

(52) U.S. Cl.
USPC ........ 348/222.1; 348/143; 348/335; 348/340; 348/345; 348/348

(58) Field of Classification Search
USPC .............. 348/222.1, 143, 335, 340, 345, 348, 348/349, 352
See application file for complete search history.

(56) References Cited

U.S. PATENT DOCUMENTS

| 5,305,045 | A  | * | 4/1994  | Terada .......................... 396/61 |
| 7,248,286 | B2 |   | 7/2007  | Cho |
| 2003/0081130 | A1 | * | 5/2003  | Cho .......................... 348/211.4 |
| 2006/0212570 | A1 | * | 9/2006  | Aritsuka et al. .............. 709/224 |
| 2008/0291271 | A1 | * | 11/2008 | Hansson et al. .............. 348/143 |

FOREIGN PATENT DOCUMENTS

KR  10-2003-0034995 A  5/2003
KR  10-0685979 B1  2/2007

\* cited by examiner

*Primary Examiner* — Yogesh Aggarwal
(74) *Attorney, Agent, or Firm* — Cha & Reiter, LLC

(57) ABSTRACT

A method for controlling a camera through a Multi-Hop-based wireless sensor network includes: sensing whether an event occurs or not in a corresponding area and transmitting position information on the corresponding area and type information on the event, converting the received position information on the event into a movement control signal for the camera, calculating camera driving values in a left/right direction and an up/down direction using the converted signal, controlling a zoom-in operation of the camera lens using the calculated camera driving values according to the received event type and photographing an object located in the corresponding direction, and transmitting the photographed images over the outer network.

14 Claims, 4 Drawing Sheets

METHOD AND SYSTEM FOR CONTROLLING CAMERA THROUGH WIRELESS SENSOR NETWORK

CLAIM OF PRIORITY

This application claims the benefit of an earlier patent application entitled "Method and System for Controlling Camera through Wireless Sensor Network," filed in the Korean Intellectual Property Office on Sep. 28, 2007 and assigned Serial No. 2007-97979, the contents of which are hereby incorporated by reference.

BACKGROUND OF THE INVENTION

1. Field of the Invention

The present invention relates to wireless multi-hop mesh sensor networks, and more particularly to a method and system for controlling a camera through a wireless sensor network, in which the camera communicates with a plurality of wireless sensor nodes forming the wireless network.

2. Description of the Related Art

Recently, the provisions of Near Field Communication (NFC) and advanced chip technology enabled networking between micro-sensors. A network having such sensors is referred to as a wireless sensor network.

The wireless sensor network is utilized for surveillance, monitoring, position identifying services, etc. and consists of (a) sensor nodes that detect, measure, and provide physical data, such as light, sound, temperatures and motion which are conditions in physical space, and (b) a sink-node at the center that receives and analyzes data flooded from the sensor nodes.

Normally, the sensor nodes include one or more sensors, actuators, microcontrollers, EEPROMs of several tens of KB, SRAMs of several KBs, frash memories of several hundreds of KB, ADC (Analog to Digital Converter), NFC modules, and a power supply for these components.

As the utilization of information on positions or situations has become more and more important recently, more advanced position identifying technology that uses cameras in cooperation with the wireless sensor network is required. Since there is a distance limitation of the wireless communication in transmitting results sensed at the sensor nodes to users, the use of Multi-Hop communication is required.

Meanwhile, webcams, which are cameras connected to the World Wide Web, permit the user to directly control the camera and capture the subject of the user's interest online. This allows the user to monitor any place by using their monitors over the internet in real time when webcam is installed.

However, the webcams cannot capture areas and objects of the user's interest automatically without the direct control by the user because the webcams are fixed. In addition, since built-in sensors or sensors with a wire connection in a short distance can be controlled based on physical sensing information thereof, there is a problem that unnecessary reactions to false sensing are generated.

SUMMARY OF THE INVENTION

Accordingly, the present invention has been made to solve the above-mentioned problems occurring in the prior art and provides additional advantages. In particular, the present invention provides wireless multi-hop mesh sensor networks, and more particularly to a method and system for controlling a camera through a wireless sensor network, in which the camera communicates with a plurality of wireless sensor nodes forming the wireless network, so that information on a position and type of an event sensed by any of wireless sensor nodes is transmitted to the camera through Multi-Hop-based wireless links, and then the camera converts the transmitted information on the position and type of the event into a movement control signal to allow the camera to control its own movement and photograph images in a corresponding direction in which the event has occurred, thereby providing automatic images of intended objects or situations without the direct control of the user.

In accordance with one aspect of the present invention, a method for controlling a camera through a Multi-Hop-based wireless sensor network includes: sensing whether an event occurs or not in a corresponding area and transmitting position information on the corresponding area and type information on the event; converting the received position information on the event into a movement control signal for the camera; calculating camera driving values in a left/right direction and an up/down direction using the converted signal; controlling a zoom-in operation of the camera lens using the calculated camera driving values according to the received event type and photographing an object located in the corresponding direction; and transmitting the photographed images over the outer network.

In accordance with another aspect of the present invention, a system for controlling a camera through a Multi-Hop-based wireless sensor network includes: a plurality of wireless sensor nodes being operable to network through wireless-links and to sense whether specified events occur or not positions of the events, and types of the events; a wireless sensor network being included of the plurality of wireless sensor nodes; a camera device being operable to receive information on positions event types information on the occurred events, to convert the received information on positions and event types into control signals, to perform the movement control in corresponding directions, and to photograph; and a controller server being operable to store images obtained from the camera device and to transmit the images to users over an internet network.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE INVENTION

Hereinafter, embodiments of the present invention will be described with reference to the accompanying drawings. For the purposes of clarity and simplicity, a detailed description of known functions and configurations incorporated herein will be omitted as it may make the subject matter of the present invention unclear.

In the specification, it is assumed that the wireless sensor nodes in the Multi-Hop wireless network included of a plurality of wireless sensors according to the present invention have programs for position information thereof and for setting a routing path thereof. It is also assumed that the Multi-Hop wireless network according to the present invention, which is formed because of distance limitation of wireless communication, includes wireless sensor nodes capable of forming a network by themselves.

Note that the method and system for controlling a camera through a wireless sensor network according to the present invention is explained hereinafter with reference to an example in which the method and system are embodied in an area which can be monitored by one camera device, but the method and system of present invention are not limited thereto and can includes a plurality of camera devices connected to a network in various embodiments.

Figure 1:
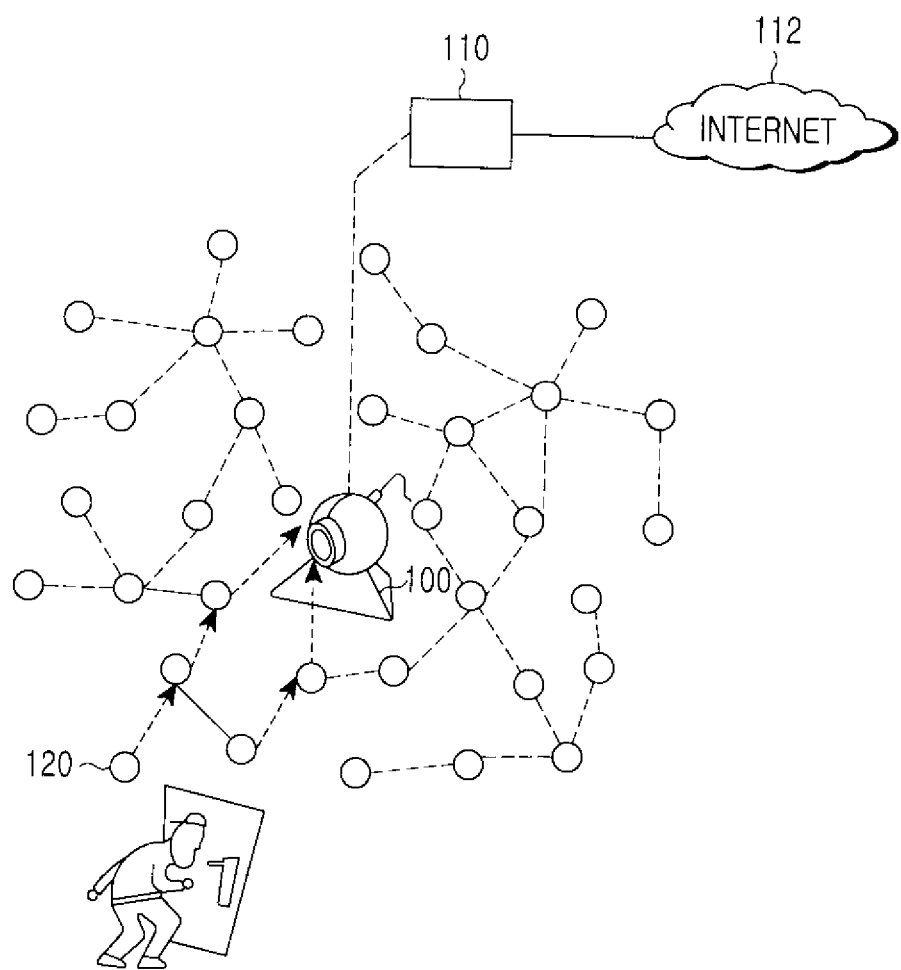
FIG. 1 is a schematic illustration of a system for controlling a camera through a wireless sensor network in accordance with an embodiment of the present invention.

FIG. 1 is a schematic illustration of a system for controlling a camera through a wireless sensor network whereto the embodiments of the present invention is applicable.

As shown, a camera device 100 is in Multi-Hop-based communication, over a wireless sensor network, with a plurality of sensor nodes 120-1 ... 120-n, which are connected to one another through wireless links. Here, each of the sensor nodes 120-1 ... 120-n is a sensor that is operable to sense either positions or movement of objects.

Briefly, when any one of the sensor nodes 120-1 ... 120-n, for example, the sensor node 120-1 senses an object or a situation of the user's interest, it transmits the sensed information to the camera device 100. The camera device 100 having received the information analyzes the position information on the object transmitted from the wireless sensor node 120-1, controls movement of the camera in a corresponding direction, and captures images of the user's interest.

The captured information is stored in a server 110 and is provided to the user over the internet 112.

Figure 2A:
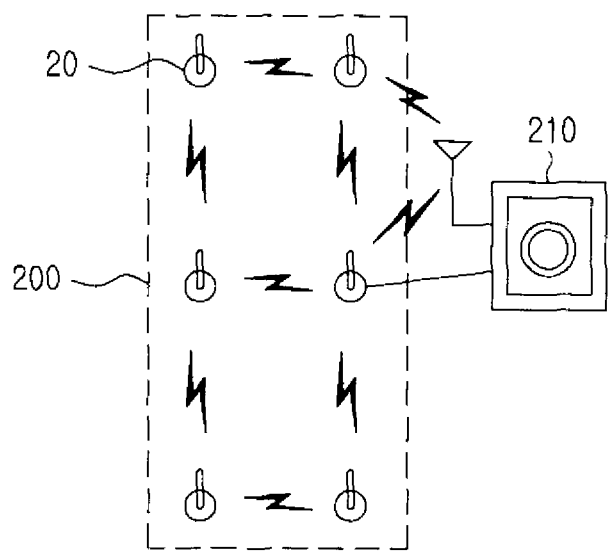
FIGS. 2A and 2B are a first embodiment and a second embodiment of the system for controlling a camera through a wireless network system in accordance with the present invention, respectively.
Figure 2B:
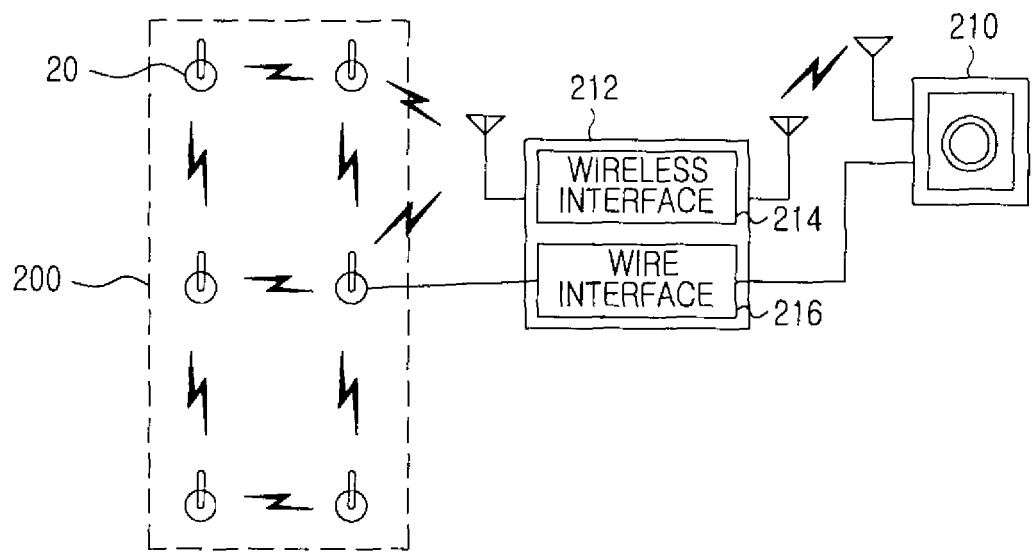

FIGS. 2A and 2B illustrate a first embodiment and a second embodiment of the system for controlling a camera through a wireless network system in accordance with the present invention, respectively.

FIG. 2A shows a camera device 210 that is directly connected to and communicates with a wireless sensor network 200 having a plurality of sensor nodes 20 ... n which are connected with one another through wireless links. FIG. 2B shows that the camera device 210 communicates with the wireless sensor network 200 via a sink/gateway 212 disposed therebetween, in which the wireless sensor network 200 includes a plurality of sensor nodes 20 ... n connected with one another through wireless links.

The sink/gateway 212 shown in FIG. 2B, which has a basic configuration for common sensor networks, may have a wire interface 216 or a wireless interface 214 to transfer data collected at each of sensor nodes in the sensor network 200 to the camera device 210.

Hereinafter, the method for controlling a camera according to an embodiment of the present invention will be described by explaining control operations of the wireless sensor nodes and the camera with reference to the components above in FIGS. 3 and 4.

Figure 3A:
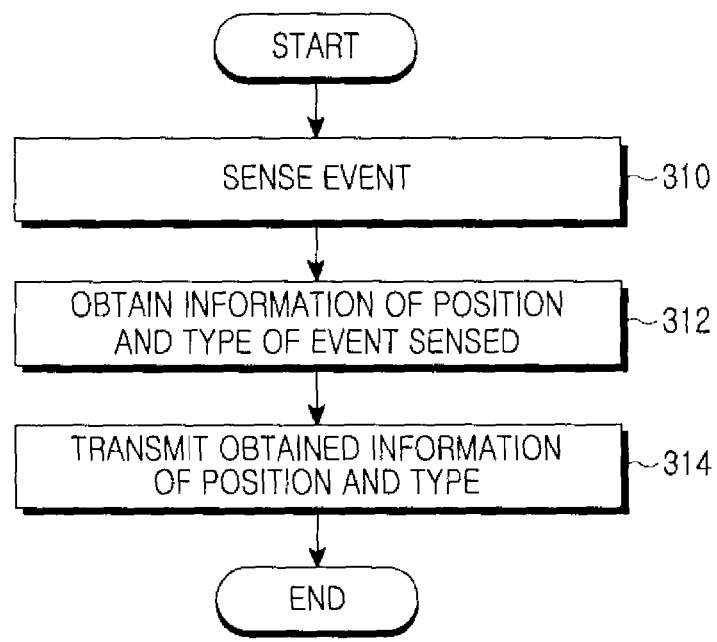
FIGS. 3A and 3B are flowcharts which show the operation processes of the wireless sensor nodes and the camera in the system for controlling a camera through a wireless sensor network of the present invention.
Figure 3B:
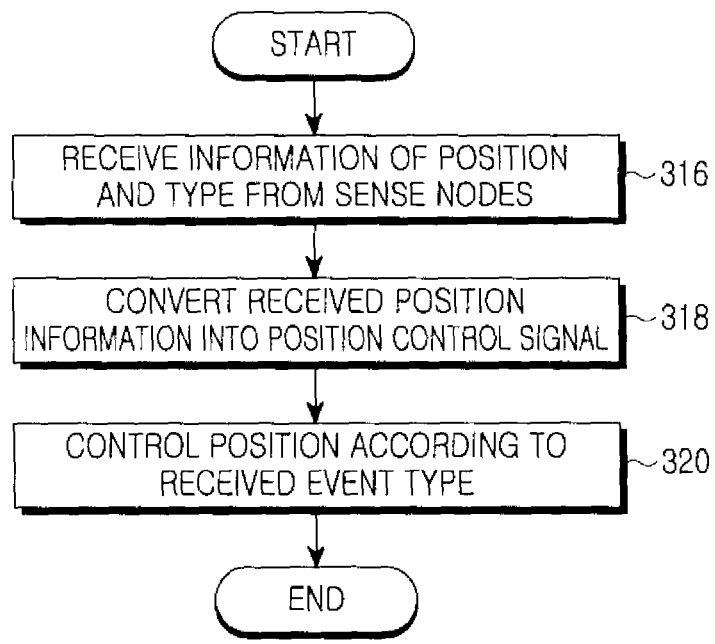

FIGS. 3A and 3B are flowcharts which show the operation processes of the wireless sensor nodes and the camera in the system for controlling a camera through a wireless sensor network according to the present invention.

Referring to FIG. 3A, when any one of the plurality of sensor nodes connected with one another through wireless links senses a position of an object, that is, checks whether an event occurs or not and then detects an event (step 310), it obtains information relating to the position and type of the event (step 312) and transmits the obtained information to the camera device through the wireless sensor network (step 314). In the event detection, the movement of the object is sensed based on the difference between a movement vector of a current frame and a movement vector of a previous frame. The movement vectors of the current frame and the previous frame are compared with each other to produce a comparative value, and if the produced comparative value is more than a preset threshold value, it is sensed that there is movement of the object.

The position information indicates a position value, for example, x, y and z of a point at which the object currently sensed by the node locates. The type information indicates one of pre-stored event types, such as an event of a fire, an event of an intrusion, etc.

FIG. 3B shows the flowchart of an operation process of the camera device according to the present invention. At first, the camera device receives the position information and the event type information sensed by each of the sensor nodes through the network (step 316). The camera device converts the received position information into a position control signal (step 318) and controls a position of the camera according to the received event type (step 320).

In greater detail, controlling the position of the camera means moving a lens of the camera 'up and down', and 'left and right' in the corresponding direction in a photographing operation of the camera.

Hereinafter, the method of controlling a camera will be described with reference to a detailed block diagram of the camera device shown in FIG. 4 in accordance with an embodiment of the present invention.

Figure 4:
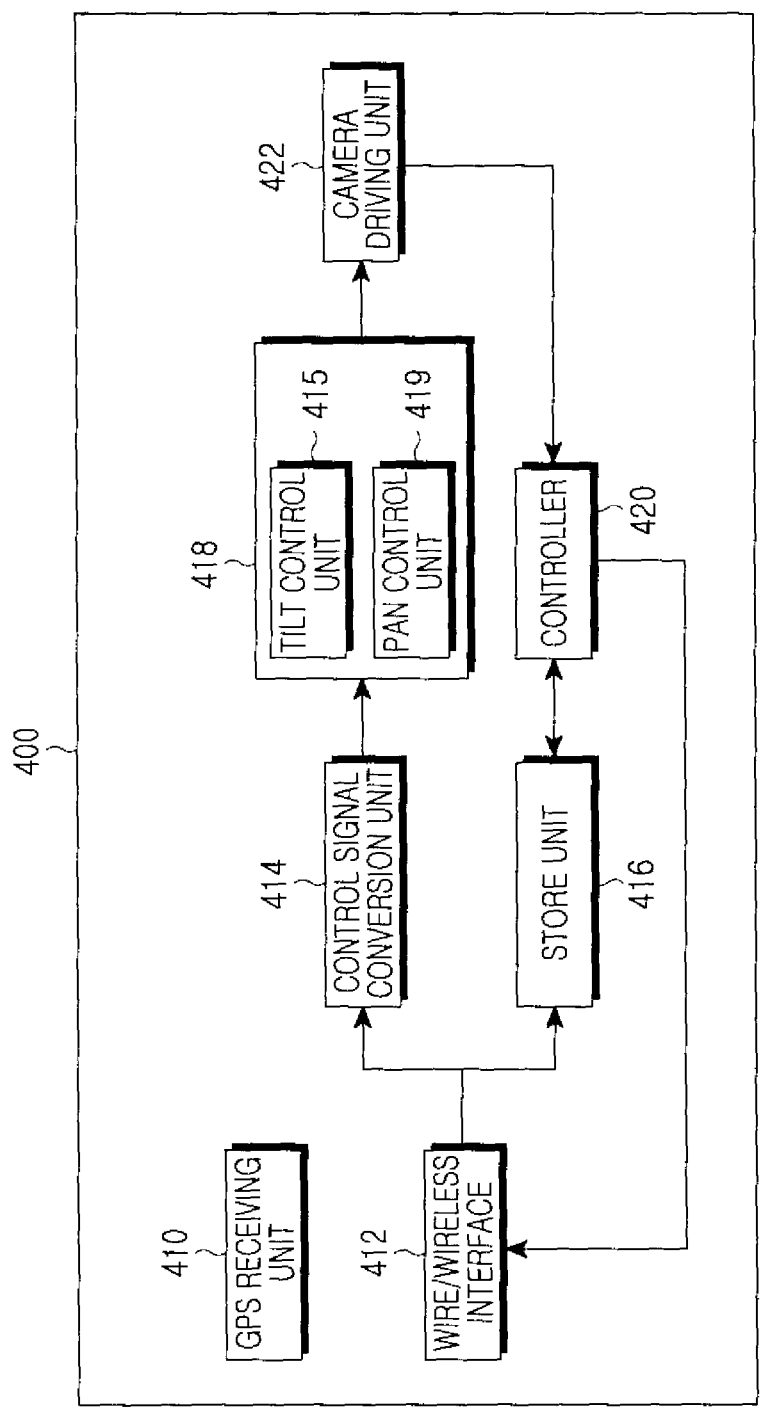
FIG. 4 is a block diagram of an example of the camera device of the present invention.

FIG. 4 is a block diagram of the inventive camera device 400, which includes a GPS receiving unit 410, a wire/wireless interface 412, a control signal conversion unit 414, a store unit 416, a movement control unit 418, a camera driving unit 422, and a controller 420.

The GPS receiving unit 410 of the camera device 400 is a component for identifying position information on the camera and allows controlling the position of the camera device corresponding to the position information on the object received from the nodes relative to the current position.

The wire/wireless interface 412 allows the camera device to receive the position information on the object from each of the sensor nodes through the wireless sensor network, and provides an interface between the camera device 400 and the wireless sensor network in a direct mode or in an indirect mode through the sink/gateway. Here, any modes defined by the IEEE 802.15.4 standard may be used as the interface mode.

The control signal conversion unit 414 is a component for converting the position information x, y and z of the object in an arbitrary space into control signals and calculates numbers of pulses. The numbers of pulses are used for the camera movement control driven by a step motor, which is configured to provide rotary movement or linear movement by a constant angle. The camera device 400 performs rotary movement or linear movement in proportion to the numbers of pulse signals calculated according to the input position information.

In greater detail, movement angles from the current position of the camera device 400 to the position received through the wireless sensor network may be calculated by the following equation.

$$\text{Movement Angle} = \cos^{-1}\left(\frac{\overline{sw}^2 + \overline{sr}^2 - \overline{rw}^2}{2 \cdot \overline{sw} \cdot \overline{sr}}\right),$$

wherein s is the position of the camera, w is the current position, and r is the received position.

Here, the movement angles in the left or right direction are calculated using the values of x and y from the values of x, y, and z, which indicate the coordinate values of the position received through the wireless sensor network relative to the current position of the camera device 400. Also, the movement angles in the up or down direction are calculated using the values of y and z from the values of x, y and z, which indicate the coordinate values of the position received through the wireless sensor network relative to the current position of the camera device 400.

Assuming that a step angle of the step motor is x per a pulse, the total number of pulses needed for one rotation of the step motor can be calculated as 360°/x. When the gear ratio of the step motor is 1/y, the actual total number of pulses is y*(360°/x). The actual total number of pulses can be expressed as the following equation.

$$\frac{\text{Movement Angle}}{\text{Step Angle}} \times Y = \text{Actual Pulse Number of Motor},$$

wherein a gear ratio of the motor is 1/Y.

The movement control unit 418 includes a tilt control unit 415 and a pan control unit 419. The movement control unit 418 receives the calculated the numbers of pulses from the control signal conversion unit 414 and controls the up and down movement of the camera device 400 through the tilt control unit 415 and the left and right movement of the camera device 400 through the pan control unit 419.

The camera driving unit 422 issues an operation instruction or a photographing instruction to the camera device 400 so that the camera device 400 can capture a current situation at a current position of the tilt motor and the pan motor of the camera controlled in proportion to the numbers of pulses calculated according to the position information input from the movement control unit 418, then obtains the captured current situation images.

Under the control of the controller 420, the images captured by the camera driving unit 422 are stored in the store unit 416 or transmitted to the user over the outer network.

As described above, the present invention has an advantage in that the camera is in cooperation with the wireless sensor network included of a plurality of the wireless sensor nodes which have the capability of wireless networking and movement sensing so that the camera can automatically move toward and photograph an object and situation sensed by the wireless sensor nodes without the direct control of the user, thereby allowing higher accuracy and faster reaction to the object and situation and faster decision. In addition, unnecessary reactions can be prevented, such as caused by wrong alarms, etc. generated from errors in the wireless sensor nodes.

While the invention has been shown and described with reference to certain exemplary embodiments thereof, it will be understood by those skilled in the art that various changes in form and details may be made therein without departing from the spirit and scope of the invention. Accordingly, the present invention should in no way be limited to the illustrative embodiments but may be defined by the scope of the appended claims along with their full scope of equivalents.

What is claimed is:

1. A method for controlling a camera through a Multi-Hop-based wireless sensor network, comprising:
    receiving, at the camera, an indication of an event related to a movement of an object from a sensor node in the Multi-Hop-based wireless sensor network, wherein the indication indicates a position information of the event and a type of the event, and wherein the event is detected by the sensor node based on a difference between a movement vector of the object at a current sensor and a movement vector of the object at a previous sensor;
    controlling a zoom-in operation of a lens of the camera according to the type of the event;
    capturing an image based on a movement control signal that causes the camera to move in at least one direction, wherein the movement control signal is generated by using the position information; and
    transmitting the captured image over a communications network.

2. The method according to claim 1, further comprising generating the movement control signal based on the position information, the generating comprising:
    calculating movement angles between a camera direction and a direction from a current position of the camera to an event occurrence position; and
    calculating a number of pulses using the calculated movement angles.

3. The method according to claim 2, wherein the movement angles are calculated by:

$$\text{Movement Angle} = \cos^{-1}\left(\frac{\overline{sw}^2 + \overline{sr}^2 - \overline{rw}^2}{2 \cdot \overline{sw} \cdot \overline{sr}}\right),$$

wherein s represents the camera direction, w represents the current position of the camera, and r represents the event occurrence position.

4. The method according to claim 2, wherein the number of pulses is calculated by:

$$\frac{\text{Movement Angle}}{\text{Step Angle}} \times Y = \text{Actual Pulse Number of Motor}$$

wherein a gear ratio of a motor of the camera is 1/Y.

5. The method according to claim 1, wherein the type of the event is one of a situational event type and a movement event type.

6. The method according to claim 1, wherein a zoom of the lens of the camera is selectively changed to a level corresponding to the type of the event.

7. A system for controlling a camera through a Multi-Hop-based wireless sensor network, comprising:
    a wireless sensor network having a plurality of sensor nodes, wherein each sensor node is operable to sense: whether specified events that are associated with a movement of an object occur or not, positions associated with the movement of the object, and types of the specified events, wherein each of the specified events is sensed based on a difference between a movement vector of the object sensed at a current sensor and a movement vector of the object sensed at a previous sensor being greater than a preset threshold;

a camera device for receiving, from any of the plurality of sensor nodes, an indication that an event associated with the movement of the object has occurred, wherein the indication includes a position information of the event and a type of the event, converting the position information into a control signal, and performing a movement control according to the control signal; and a controller server for storing images captured by the camera device and transmitting the images over a network.

8. The system according to claim 7, wherein the camera device comprises:
   a Global Positioning System (GPS) receiving unit for identifying a current position of the camera device;
   a control signal conversion unit for converting the position information into the control signal;
   a movement control unit for controlling movement of the camera device and a zoom of a lens of the camera device based on the control signal; and
   a camera driving unit for causing the camera device to capture an image.

9. The system according to claim 8, wherein the movement control unit comprises:
   a tilt control unit for controlling up/down movement of the camera device according to a calculated number of pulses; and
   a pan control unit for controlling left/right movement of the camera device according to the calculated number of pulses.

10. The system according to claim 9, wherein the control signal conversion unit generates the control signal
   by using a movement angle between a camera direction and a direction from a current position of the camera to a corresponding event occurrence position by:

$$\text{Movement Angle} = \cos^{-1}\left(\frac{\overline{sw}^2 + \overline{sr}^2 - \overline{rw}^2}{2 \cdot \overline{sw} \cdot \overline{sr}}\right)$$

wherein s represents the camera direction, w represents the current position of the camera, and r represents the event occurrence position, and wherein the number of pulses is obtained by using the movement angle by:

$$\frac{\text{Movement Angle}}{\text{Step Angle}} \times Y = \text{Actual Pulse Number of Motor}$$

wherein a gear ratio of a motor of the camera device is 1/Y.

11. The system according to claim 8, wherein the camera device further comprises a communications interface for receiving information transmitted by any of the sensor nodes.

12. The system according to claim 8, wherein the zoom of the lens of the camera device is selectively changed to a level corresponding to the type of the event.

13. The system according to claim 7, further comprising an interface device for providing an interface between the wireless sensor network and the camera device.

14. The system according to claim 7, wherein the type of the event includes at least one of a movement event type and an intrusion event type.

* * * * *